United States Patent [19]

Bencic

[11] Patent Number: 5,452,908
[45] Date of Patent: Sep. 26, 1995

[54] COLLAPSIBLE WORK STOWAGE CART

[76] Inventor: Mirko Bencic, 64-44 65th La., Middle Village, N.Y. 11379

[21] Appl. No.: 231,733

[22] Filed: Apr. 25, 1994

[51] Int. Cl.$^6$ ........................................ B62B 3/02
[52] U.S. Cl. ................... 280/47.35; 280/47.18; 280/47.19; 280/47.2
[58] Field of Search .................. 280/30, 47.17, 280/47.18, 47.19, 47.2, 47.26, 47.27, 47.35, 47.315, 62, 651, 655, 655.1, 47.131

[56] References Cited

U.S. PATENT DOCUMENTS

| | | | |
|---|---|---|---|
| 2,964,328 | 12/1960 | Muir | 280/47.19 |
| 3,118,685 | 1/1964 | Jordan | 280/47.19 |
| 4,976,450 | 12/1990 | Ellefson | 280/47.35 |
| 5,224,531 | 7/1993 | Blohm | 280/47.2 |

FOREIGN PATENT DOCUMENTS 2657576  8/1991  France ................. 280/47.2

Primary Examiner—Mitchell J. Hill
Attorney, Agent, or Firm—Michael I. Kroll

[57] ABSTRACT

A collapsible work stowage cart is provided, which consists of a storage chest for holding work equipment therein. A tool box is on the storage chest for carrying hand tools. A foldable worktable is on the storage chest at which manual work is done. A structure is for moving the storage chest along a generally flat horizontal surface, when the cart is changed from a working mode into a transporting mode.

5 Claims, 5 Drawing Sheets

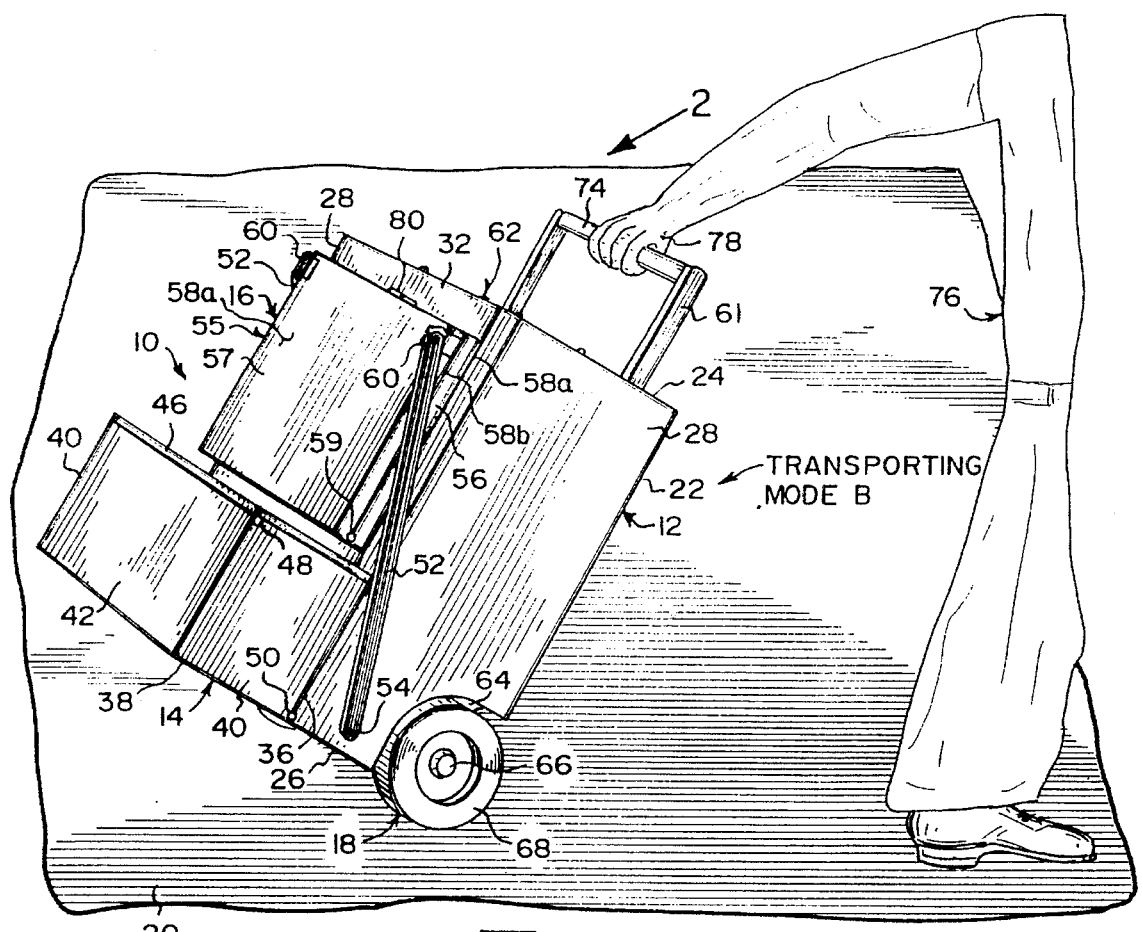

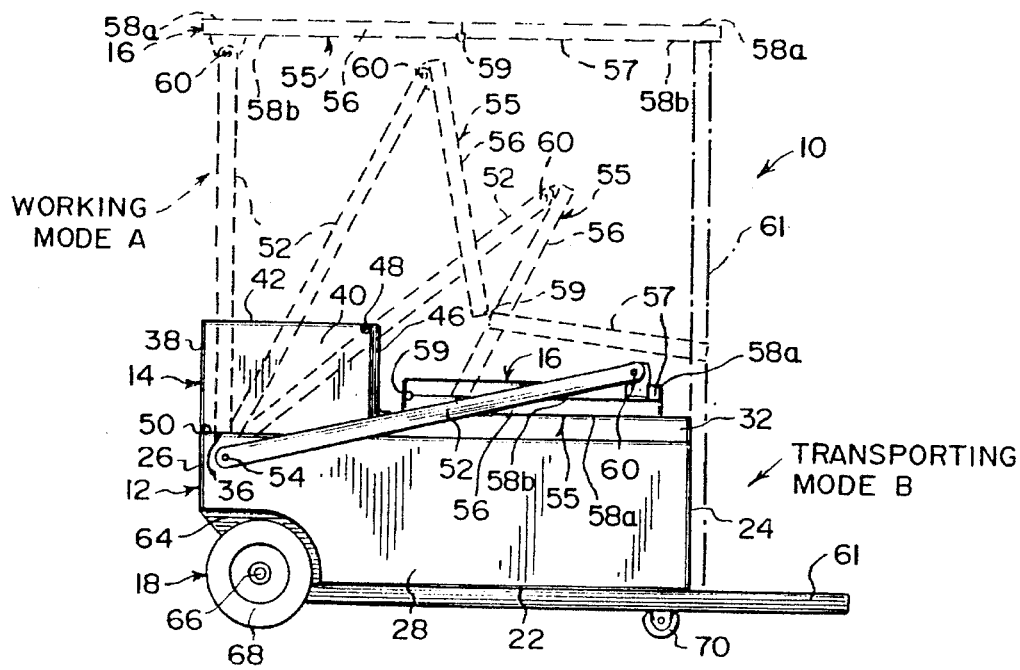
Fig. 3
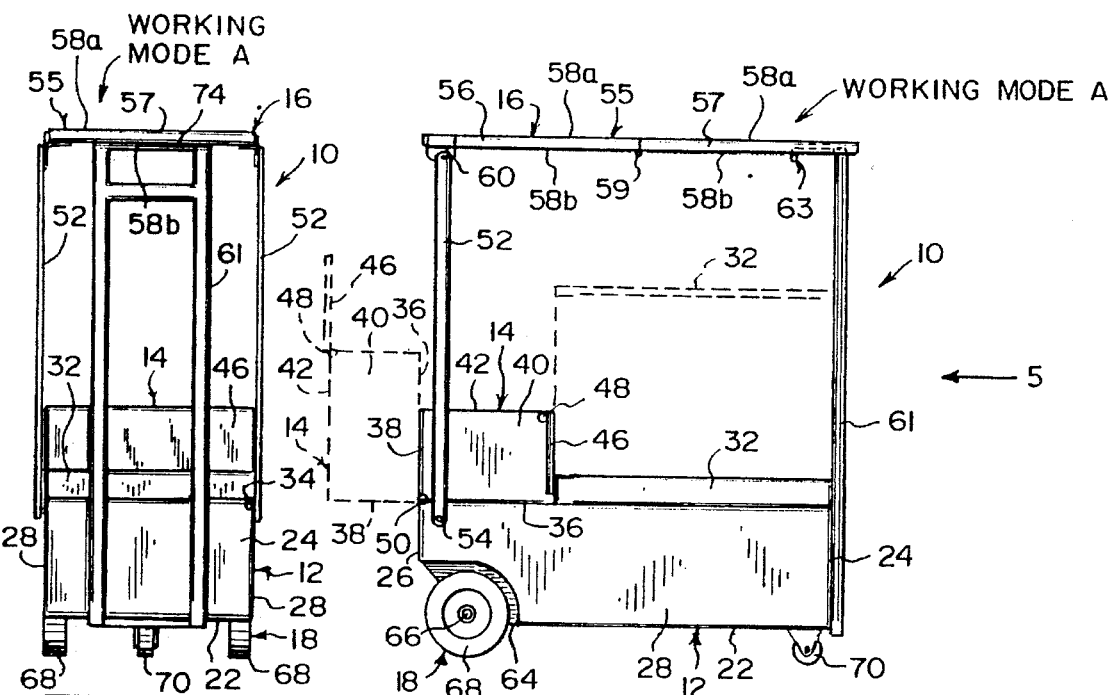
Fig. 5
Fig. 4

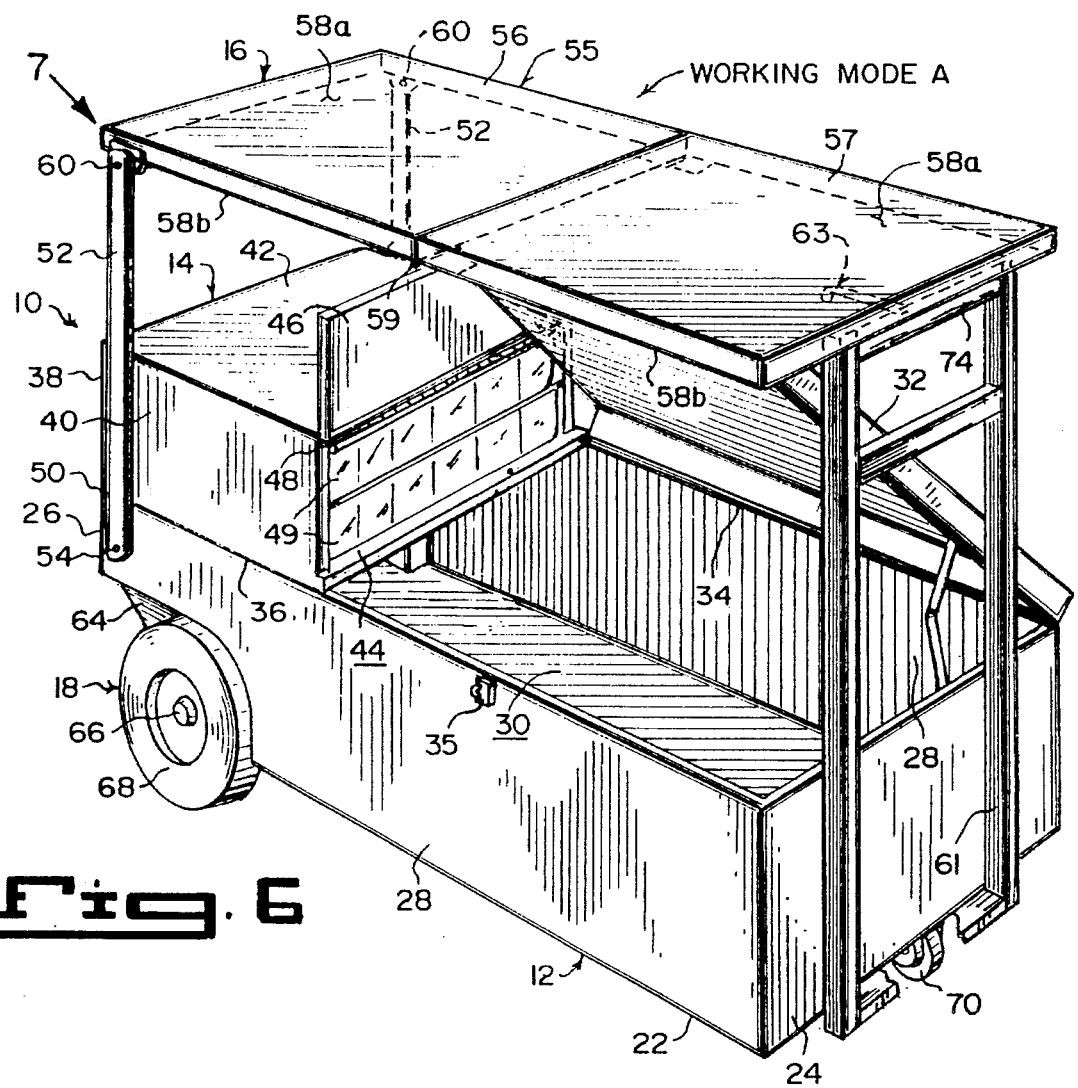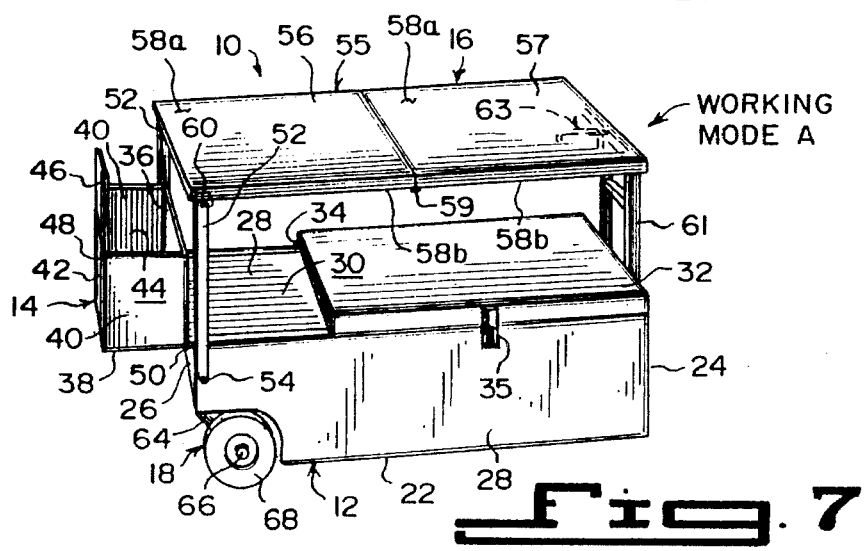

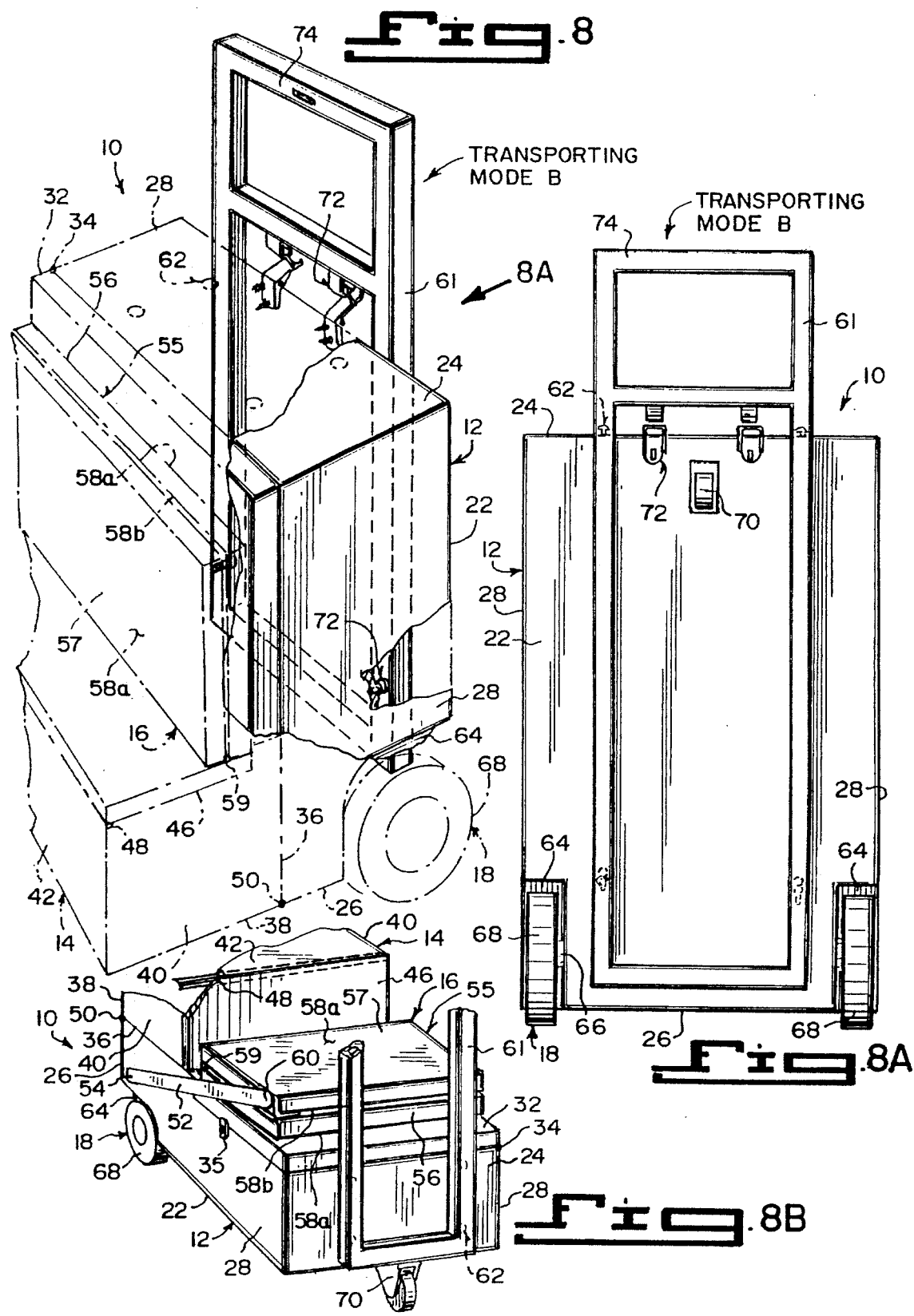

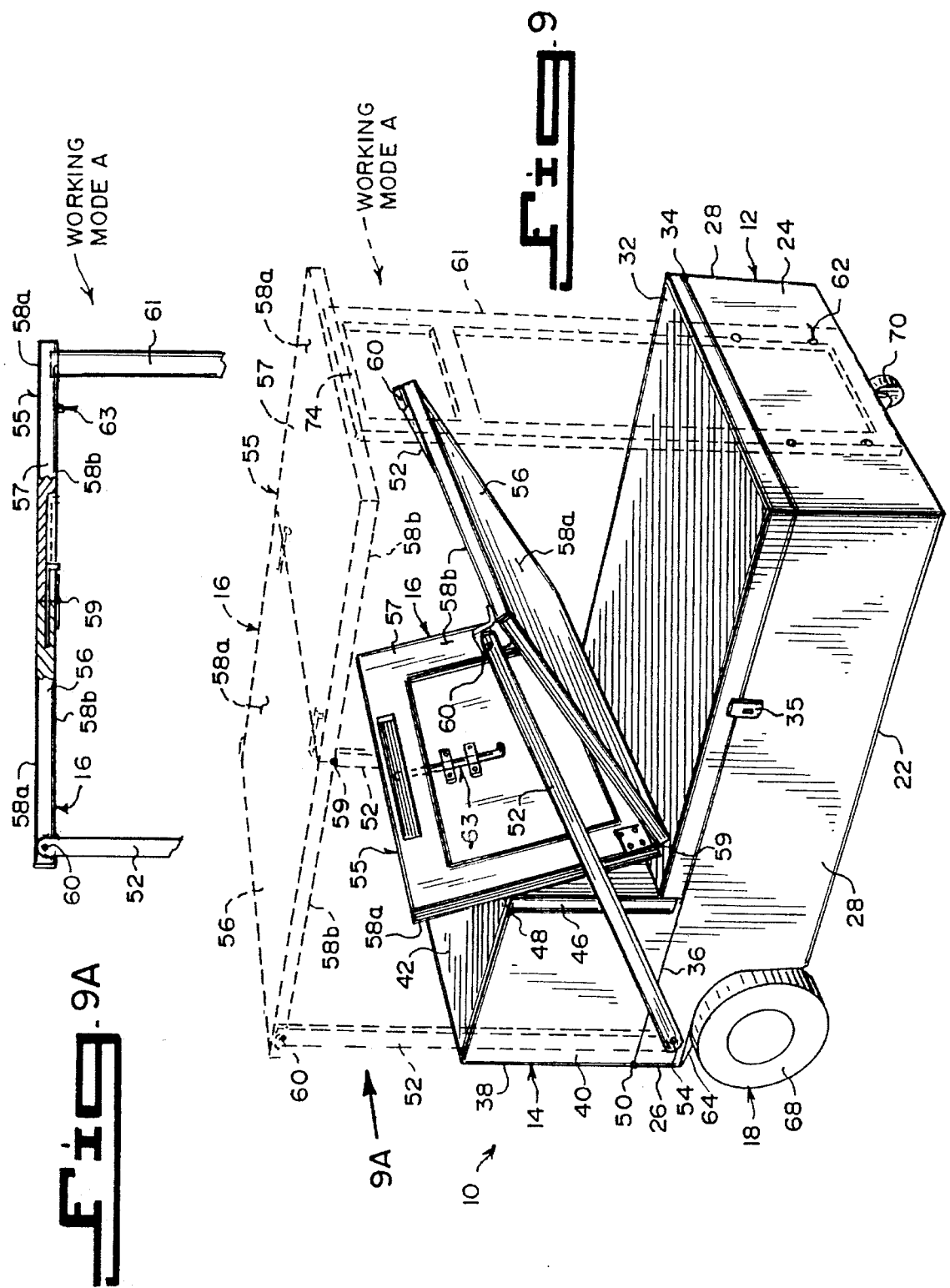

1

COLLAPSIBLE WORK STOWAGE CART

BACKGROUND OF THE INVENTION

1. Field of the Invention

The instant invention relates generally to workbenches and more specifically it relates to a collapsible work stowage cart.

2. Description of the Prior Art

Numerous workbenches have been provided in prior art that are sturdy tables at which manual work is done. While these units may be suitable for the particular purpose to which they address, they would not be as suitable for the purposes of the present invention as heretofore described.

SUMMARY OF THE INVENTION

A primary object of the present invention is to provide a collapsible work stowage cart that will overcome the shortcomings of the prior art devices.

Another object is to provide a collapsible work stowage cart that contains a storage chest, a tool box and a worktable which can be folded up when not in use.

An additional object is to provide a collapsible work stowage cart that can be changed from a transporting mode to a working mode and vice versa, very quickly with little effort.

A further object is to provide a collapsible work stowage cart that is simple and easy to use.

A still further object is to provide a collapsible work stowage cart that is economical in cost to manufacture.

Further objects of the invention will appear as the description proceeds.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

BRIEF DESCRIPTION OF THE DRAWING FIGURES

FIG. 1 is a perspective view of the instant invention in its transporting mode being pulled by a handle in a stanchion assembly.

FIG. 2 is a perspective view taken in the direction of arrow 2 in FIG. 1.

FIG. 3 is a side view taken in the direction of arrow 3 in FIG. 2, showing the instant invention in the transporting mode and in the working mode in phantom.

FIG. 4 is a side view of the instant invention similar to FIG. 3, in the working mode.

FIG. 5 is a front view taken in the direction of arrow 5 in FIG. 4.

FIG. 6 is a perspective view similar to FIG. 2 of the instant invention in the working mode.

FIG. 7 is a perspective view taken in the direction of arrow 7 in FIG. 6.

FIG. 8 is a perspective view of the instant invention in the transporting mode and in an upright storage position with parts broken away and shown in phantom.

FIG. 8A is a bottom view taken in the direction of arrow 8A in FIG. 8.

FIG. 8B is a perspective view of the instant invention in transition between the transporting mode and the working mode with parts broken away.

FIG. 9 is a perspective view of the instant invention going from the transporting mode into the working mode shown in phantom.

FIG. 9A is a side view of the worktable when in the working mode, taken in the direction of arrow 9A in FIG. 9 with parts broken away and in section.

DETAILED DESCRIPTION OF THE PREFERRED EMBODIMENTS

Turning now descriptively to the drawings, in which similar reference characters denote similar elements throughout the several views, FIGS. 1 through 9 illustrate a collapsible work stowage cart 10, which consists of a storage chest 12 for holding work equipment therein. A tool box 14 on the storage chest is for carrying hand tools. A foldable worktable 16 is on the storage chest 12, at which manual work is done. A structure 18 is for moving the storage chest 12 along a generally flat horizontal surface 20, when the cart is changed from a working mode "A" into a transporting mode "B".

The storage chest 12 includes a bottom wall 22. A front wall 24 extends upwardly from the bottom wall 22. A rear wall 26 extends upwardly from the bottom wall 22. A pair of side walls 28 are provided, with each extending upwardly from the bottom wall 22 between the front wall 24 and the rear wall 26, to form an open top compartment 30 for holding the work equipment therein. A lid 32 covers most of the open top compartment 30. A first hinge 34 is between one side of the lid 32 and a top edge of one side wall 28, so that the lid 32 can lift up. A latch 35 can be provided for retaining the lid 32 in a closed position over the open top compartment 30.

The tool box 14 contains a bottom wall 36. A rear wall 38 extends upwardly from the bottom wall 36. A pair of side walls 40 are provided, with each extending upwardly from the bottom wall 36. A top wall 42 is over the bottom wall 36, the rear wall 38 and the side walls 40 to form an open front compartment 44 for carrying the hand tools therein. A door 46 covers the open front compartment 44. A second hinge 48 is between a top edge of the door 46 and a front top edge of the top wall 42, so that the door 46 can lift up. A plurality of pull out trays 49, as shown in FIG. 6, can be within the open front compartment 44 for carrying the hand tools therein. A third hinge 50 is between a rear bottom edge of the bottom wall 36 and a top edge of the rear wall 26 of the storage chest 12, so that the tool box 14 can lift up from the storage chest 12, only after the lid 32 is lifted up.

The foldable worktable 16 includes a pair of legs 52. A first pair of pivot pins 54 are provided, with each for attaching a lower portion of one leg 52 to an upper corner of one side wall 28 of the storage chest 12. A tabletop 55 is divided into two panels 56, 57, each having an upper work surface 58a and a bottom surface 58b. A fourth hinge 59 extends transversely below abutting ends of the two panels 56, 57 of the tabletop 55. The two panels 56, 57 can be inverted, with the bottom surfaces 58b folding over onto each other on the lid 32 of the storage chest 12. A second pair of pivot pins 60 are provided, with each for attaching an upper portion of one leg 52 to a rear side of the rear panel 56 of the tabletop 55. A support frame 61 is provided. An assembly 62 is for mounting in a removable manner the support frame 61 in an upright position onto the front wall 24 of the storage chest 12. A unit 63 is for retaining a front side of the front panel 57 of the table top 55 to a distal end of the support frame 61, when the two panels 56, 57 of the tabletop 55 are unfolded and put in the working mode "A" (see FIG. 9A).

The moving structure 18 consists of each side wall 28 of the storage chest 12 having a wheel well 64 formed at a lower rear corner thereof. An axle 66 extends through the wheel wells 64. A pair of wheels 68 are provided, with each rotatively mounted on each end of the axle 66 within one wheel well 64. A central front steering caster 70 is mounted to a bottom surface at a front end of the bottom wall 22 of the storage chest 12. The wheels 68 and the caster 70 can roll along the generally flat horizontal surface 20.

A facility 72 is on an outer surface of the bottom wall 22 of the storage chest 12, for affixing in a removable manner the support frame 61 thereto, when in the transporting mode "B". Most of the support frame 61 is directly under the bottom wall 22 of the storage chest 12, while the distal end of the support frame 61 extends outwardly away from the front wall 24 of the storage chest 12. A handle 74 is on the distal end of the support frame 61. When the support frame 61 is in the transporting mode "B", a person 76 can grip the handle 74 by the hand 78 and raise up the storage cart 12 at an angle, to pull the wheels 68 along the generally flat horizontal surface 20, as shown in FIG. 1.

A retaining mechanism 80 can also be provided, as shown in FIGS. 1 and 2. The retaining mechanism 80 will hold the folded panels 56, 57 of the tabletop 55 to the lid 32 in a stationary manner, when the collapsible work stowage cart 10 is in the transporting "B".

OPERATION OF THE INVENTION

To position the collapsible work stowage cart 10 in the working mode "A", the following steps should be taken:

1. Attach the support frame 61 to the mounting assembly 62 in an upright position onto the front wall 24 of the storage chest 12.
2. Lift up the two panels 56, 57 of the tabletop 55 off of the lid 32.
3. Unfold the two panels 56, 57 of the tabletop 55.
4. Place the legs 52 in a vertical position.
5. Lock the front side of the front panel 57 of the tabletop 55 to the distal end of the support frame 61 with the retaining unit 63.
6. Lift up the lid 32 on the storage chest 12.
7. Open the door 46 of the tool box 14.
8. Flip the tool box 14 back away from the storage chest 12.

To position the collapsible work stowage cart 10 in the transporting mode "B", the following steps should be taken:

1. Flip the tool box onto the storage chest 12.
2. Close the door 46 of the tool box 14.
3. Lower the lid 32 back onto the storage chest 12.
4. Disengage the front side of the front panel 57 of the tabletop 55 from the distal end of the support frame 61 by unlocking the retaining unit 63.
5. Move the legs 52 downwardly towards the lid 32 of the storage chest 12.
6. Fold back the two panels 56, 57 of the tabletop 55.
7. Put the folded two panels 56, 57 of the tabletop 55 on the lid 32.
8. Remove the support frame 61 from the mounting assembly and engage it to the affixing facility 72 on the bottom wall 22 of the storage chest 12.
9. Grip the handle 74 on the support frame 61.
10. Raise up the storage cart 12 at an angle by the handle 74.
11. Pull the wheels 68 along the generally flat horizontal surface 20.

List of Reference Numbers

A working mode
B transporting mode
10 collapsible work stowage cart
12 storage chest in 10
14 tool box in 10
16 foldable worktable in 10
18 moving structure in 10
20 generally flat horizontal surface
22 bottom wall of 12
24 front wall of 12
26 rear wall of 12
28 side wall of 12
30 open top compartment in 12
32 lid of 12
34 first hinge between 28 and 32
35 latch for 32
36 bottom wall of 14
38 rear wall of 14
40 side wall of 14
42 top wall of 14
44 open front compartment in 14
46 door of 14
48 second hinge in 14
49 pull out tray in 44
50 third hinge between 26 and 36
52 leg of 16
54 first pivot pin of 16
55 tabletop of 16
56 rear panel of 55
57 front panel of 55
58a upper work surface of 56 and 57
58b bottom surface of 56 and 57
59 fourth hinge between 56 and 57
60 second pivot pin of 16
61 support frame
62 mounting assembly on 24 for 61
63 retaining unit
64 wheel well of 18
66 axle of 18
68 wheel of 18
70 front steering caster of 18
72 affixing facility on 22 for 61
74 handle on 61
76 person
78 hand of 76
80 retaining mechanism for 56, 57 on 32

It will be understood that each of the elements described above, or two or more together may also find a useful application in other types of methods differing from the type described above.

While certain novel features of this invention have been shown and described and are pointed out in the annexed claims, it is not intended to be limited to the details above, since it will be understood that various omissions, modifications, substitutions and changes in the forms and details of the device illustrated and in its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is new and desired to be protected by Letters Patent is set forth in the appended claims:

1. A collapsible work stowage cart which comprises:
   a) a storage chest for holding work equipment therein, said storage chest including a bottom wall, a front wall extending upwardly from said bottom wall, a rear wall extending upwardly from said bottom wall, and a pair of side walls, each extending upwardly from said bottom wall between said front wall and said rear wall, to form an open top compartment for holding the work equipment therein, said storage chest further including a lid to cover most of the open top compartment, and a first hinge between one side of said lid and a top edge of one said side wall, so that said lid can lift up, and a latch for retaining said lid in a closed position over the open top compartment;
   b) a tool box on said storage chest for carrying hand tools, said tool box including a bottom wall, a rear wall extending upwardly from said bottom wall, a pair of side walls, each extending upwardly from said bottom wall, and a top wall over said bottom wall, said rear wall and said side walls to form an open front compartment for carrying the hand tools therein, a door to cover the open front compartment, and a second hinge between a top edge of said door and a front top edge of said top wall, so that said door can lift up, said tool box further including a plurality of pull out trays within the open front compartment for carrying the hand tools therein, and a third hinge between a rear bottom edge of said bottom wall and a top edge of said rear wall of said storage chest, so that said tool box can lift up from said storage chest only after said lid is lifted up;
   c) a foldable worktable on said storage chest at which manual work is done; and
   d) means for moving said storage chest along a generally flat horizontal surface, when said cart is changed from a working mode into a transporting mode.

2. A collapsible work stowage cart as recited in claim 1, wherein said foldable worktable includes:
   a) a pair of legs;
   b) a first pair of pivot pins, each for attaching a lower portion of one said leg to an upper corner of one said side wall of said storage chest;
   c) a tabletop divided into two panels, each having an upper work surface and a bottom surface;
   d) a fourth hinge extending transversely below abutting ends of said two panels of said tabletop, so that said two panels can be inverted, with the bottom surfaces folding over onto each other on said lid of said storage chest;
   e) a second pair of pivot pins, each for attaching an upper portion of one said leg to a rear side of said rear panel of said tabletop;
   f) a support frame;
   g) means for mounting in a removable manner said support frame in an upright position onto said front wall of said storage chest; and
   h) means for retaining a front side of said front panel of said tabletop to a distal end of said support frame, when, said two panels of said tabletop are unfolded.

3. A collapsible work stowage cart as recited in claim 2, wherein said moving means includes:
   a) each said side wall of said storage chest having a wheel well formed at a lower rear corner thereof;
   b) an axle extending through said wheel wells;
   c) a pair of wheels, each rotatively mounted on each end of said axle within one said wheel well; and
   d) a central front steering caster mounted to a bottom surface at a front end of said bottom wall of said storage chest, so that said wheels and said caster can roll along the generally flat horizontal surface.

4. A collapsible work stowage cart as recited in claim 3, further comprising means on outer surface of said bottom wall of said storage chest, for affixing in a removable manner said support frame thereto when in the transporting mode, whereby most of said support frame is directly under said bottom wall of said storage chest, while the distal end of said support frame extends outwardly away from said front wall of said storage chest.

5. A collapsible work stowage cart as recited in claim 4, further including a handle on the distal end of said support frame, so that when said support frame is in the transporting mode, a person can grip said handle by the hand and raise up said storage cart at an angle, to pull said wheels along the generally flat horizontal surface.

* * * * *